United States Patent [19]
Kwon

[11] Patent Number: 6,160,835
[45] Date of Patent: Dec. 12, 2000

[54] HAND-HELD MARKER WITH DUAL OUTPUT LASER

[75] Inventor: Young Key Kwon, Lafayette, Colo.

[73] Assignee: Rocky Mountain Instrument Co., Lafayette, Colo.

[21] Appl. No.: 09/045,003

[22] Filed: Mar. 20, 1998

[51] Int. Cl.[7] .............................. H01S 3/08; B23K 26/00
[52] U.S. Cl. ...................................... 372/108; 219/121.68
[58] Field of Search ....................... 372/108; 219/121.68; 235/472; 33/24; 358/299; 356/5.01

[56] References Cited

U.S. PATENT DOCUMENTS

| | | | |
|---|---|---|---|
| 4,146,966 | 4/1979 | Levine et al. | 33/24 |
| 4,515,867 | 5/1985 | Bleacher et al. | 428/204 |
| 4,769,310 | 9/1988 | Gugger et al. | 430/346 |
| 4,912,298 | 3/1990 | Daniels et al. | 219/121.69 |
| 4,985,780 | 1/1991 | Garnier et al. | 358/299 |
| 5,061,341 | 10/1991 | Kildal et al. | 156/632 |
| 5,075,195 | 12/1991 | Babler et al. | 430/200 |
| 5,107,100 | 4/1992 | Shepard et al. | 235/472 |
| 5,262,613 | 11/1993 | Norris et al. | 219/121.68 |
| 5,394,233 | 2/1995 | Wang | 356/5.01 |
| 5,457,706 | 10/1995 | McGuckin et al. | 372/20 |
| 5,523,125 | 6/1996 | Kennedy et al. | 427/555 |
| 5,543,269 | 8/1996 | Chatterjee et al. | 430/346 |

OTHER PUBLICATIONS

"Image Micro–matching with TEA CO2 Lasers", Nelson et al. 1975, SME Technical Paper MR75–584.

*Primary Examiner*—Frank G. Font
*Assistant Examiner*—Armando Rodriguez
*Attorney, Agent, or Firm*—Rick Martin; Patent Law Offices of Rick Martin, P.C.

[57] ABSTRACT

A diode laser pumps a laser crystal in a known manner. A series of bypass mirrors selectively bypass the diode output beam around the laser crystal and directly out the same exit port as the pumped laser output beam. A hand held enclosure houses this dual laser head and supporting optics in a portable laser housing. Support electronics are optionally enclosed along with the applicator assembly and a battery. A transceiver to a host computer is included along with an optional exhaust and filter system.

13 Claims, 4 Drawing Sheets

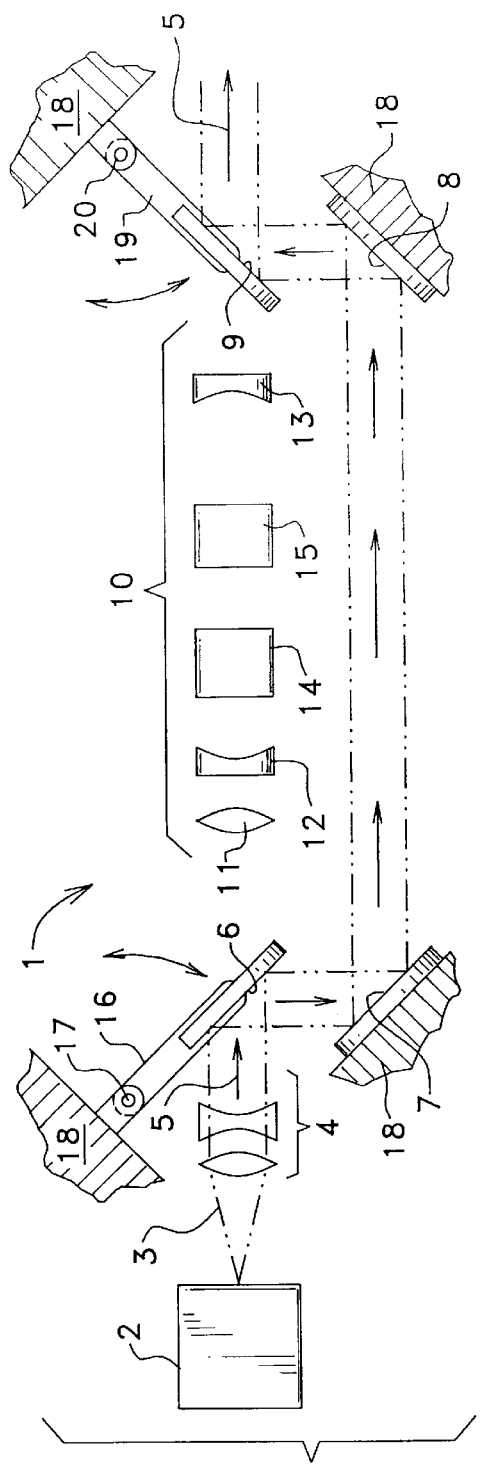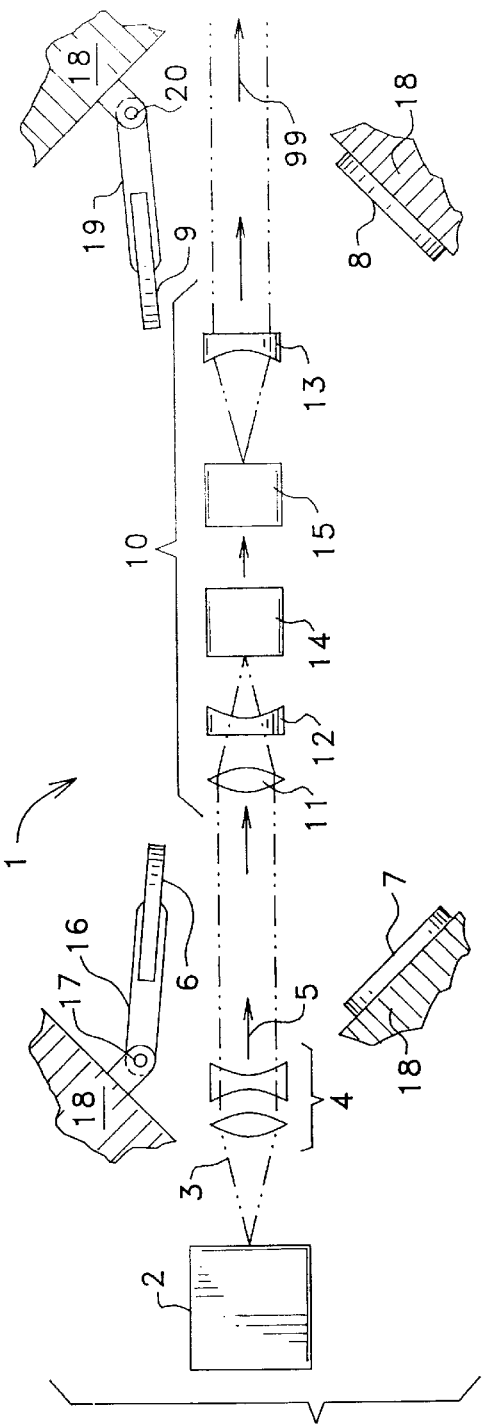

HAND-HELD MARKER WITH DUAL OUTPUT LASER

FIELD OF INVENTION

The present invention relates to a diode pumped laser having a typical high quality beam output, but also having a bypass path to provide a direct diode laser beam output and a hand held marker using dual output diode pump laser.

BACKGROUND OF THE INVENTION

In the art of laser engraving a wide range of products are marked including glass, ceramics, steel, plastics, rubber and wood. Various processes are used requiring a wide range of laser beam output properties. Diode only beam outputs usually vary between 1–30 watts power in CW. The beam size is relatively large ranging from 1–4 mm in diameter. The power distribution is usually flat across the spot diameter. Some uses for this type of laser beam with focusing optics include cutting materials or marking materials which are opaque such as wood, rubber, and plastics.

In contrast to the diode laser beam is the diode pumped laser beam whose outputs generally vary from 1–10 watts power continuous wave (cw). The typical Q-switched laser beam size is around 1 mm in diameter. The power distribution is Gaussian having a concentration in the center of the beam. In the Q-switch mode 20 kilowatts or higher of peak power is achieved with 10–30 nanosecond pulses. This type beam is particularly useful for engraving metals.

A brief description of some typical laser engraving applications follows below.

U.S. Pat. No. 4,985,780 (1991) to Garnier et al. discloses a flat bed flying optics laser engraver. Portability is achieved with a first mirror to receive the laser beam and reflect the beam 90°. A second mirror re- directs the laser beam parallel to the laser beam output, and opposite in direction. A third mirror re-directs the laser beam 90°. A fourth mirror re-directs the laser beam downward onto the workpiece. The third and fourth mirrors move with the X-Y carriage assembly. The assembly weighs less then 75 pounds using ball screw and ball nut components.

U.S. Pat. No. 5,523,125 (1996) to Kennedy et al. discloses a laser based mask printing method for marking basketballs, etc. With trademarks. The laser is used to ablate the marking design into a mask before printing over the mask. This is only a printing method. Therefore, no §103 basis is provided.

U.S. Pat. No. 5,061,341 (1991) to Kildal et al. discloses a printing method to prevent damage to a pigmented plastic article when ink on the article is ablated away by a laser beam. Various coatings of binders and solvents are used. This is only a printing method.

Any laser capable of ablating away the dark coating without ablating away all of the intermediate layer is useful. Highly preferred for such purposes are conventional pulsed lasers that deliver high energy in one or more pulses on a short period of time. Most preferred are those that deliver at least 4 joules per $10^{-6}$ sec over an area of about 1.2 cm$^2$, such as CO$_2$ lasers. Convention TEA CO$_2$ lasers are well-known to be useful for this purpose, for example, as described in the article "Image Micro-machining with TEA CO$_2$ Lasers", Nelson et al, printed in 1975 in the SME Technical Paper identified as MR75-584. Still other useful lasers that deliver useful energy include pulsed YAG and scanning beam lasers such as continuos CO$_2$ or Q switched YAG lasers.

U.S. Pat. No. 4,912,298 (1990) to Daniels et al. discloses an ablating process to mark optical lenses. An excimer laser having the energy of the laser beam ranging from 1 to 5 J/CM$^2$ is used. The mark is more recognizable when the lens has an anti-reflection coating due to the disturbance of the interference condition of reflected light. No chemical processes are taught.

U.S. Pat. No. 4,515,867 (1985) to Bleacher et al. discloses a three step method to mark a glass substrate such as a CRT. First a dark undercoating is applied and dried in under a minute. Second a light colored overcoating is applied in under a minute. Third a laser beam ablates the marking from the light colored overcoating, thus leaving the marking visible as the dark undercoating shines through. The undercoating contains mica particles whereas the overcoating does not. The coatings are made of alkali silicate binder. This is only a printing method.

Another related group of marking methods is a laser combined with glass frit or metal oxide marking mediums. U.S. Pat. No. 4,769,310 (1988) to Gugger et al. teaches first creating a glaze in a kiln process. The glaze has a radiation sensitive additive in amounts ranging from 0.01 to 30% by weight. This glaze is then irradiated by a beam of Nd:YAG pulsed laser having light pulses of six to eight nanoseconds at a wavelength of 0.532 $\mu$m and a pulse content of 250 milli-joules.

Energy-rich sources such as lasers are conveniently used to mark the inorganic materials suitable for use in the practice of this invention. The procedure comprises either applying the energy source to the form of the graphic symbols to be applied or focusing it thereon, such that a change in color is induced at the irradiated areas without causing any perceptible damage to the surface of the marked material. Suitable lasers are e.g. those that radiate energy at a wavelength in the near UV range, in the visible range and/or infra-red range.

Examples of such energy sources are solid state pulsed lasers such as ruby lasers or frequency multiplied Nd:YAG lasers, pulsed lasers with booster such as pulsed dye lasers or Raman shifter, and also continuous wave lasers with pulse modifications (Q-Switch, mode locker), for example on the basis of CW Nd:YAG lasers with frequency multiplier or CW ion lasers (Ar, Kr), as well as pulsed metal vapor lasers, for example copper vapor lasers or gold vapor lasers, or high capacity pulsed semi-conductor lasers, and also pulsed gas lasers such as excimers.

Depending on the laser system employed, pulse contents of up to several Joules, intensities of up to $10^{12}$ W/cm$^2$, pulse durations of up to $10^{-15}$ seconds and frequencies of up to $10^9$ Hz are possible. Pulse contents of micro-Joule to Joule, intensities of kilowatt/cm$^2$ to 100 megawatt/cm$^2$, pulse durations of microseconds to picoseconds, and frequencies of hertz to 250 megahertz are advantageously used.

It is preferred to use lasers with pulsed light, for example those listed in the following table. Especially preferred lasers are pulsed of pulse-modified, frequency doubled Nd:YAG lasers or metal vapor lasers such as Au- or, in particular, Cu-vapor lasers. Also particularly preferred is a laser beam having a wavelength in the visible and/or near infra-red range. By near infra-red range is meant the range from 0.78 $\mu$m to 2 $\mu$m.

The following table lists a number of commercially available lasers which may be suitably used in the practice of this invention.

TABLE I

| Type/Representative | Examples of commercially available types | Principal wavelength (subsidiary wavelengths) (mm) |
|---|---|---|
| Solid state pulsed lasers | | |
| ruby laser | Lasermetrics (938R6R4L-4 | 694 (347) |
| Nd:YAG laser | Quanta Ray (DCR 2A) | 1064, (532, 355,266) |
| Alexandrite laser | Apollo (7562) | 730–780 |
| Pulsed lasers with booster such as | | |
| Raman shifter | Quanta Ray (RS-1) | UV-IR |
| dye laser | Lambda Physik FL 2062 | c 300–1000 |
| CW laser with pulse modification | | |
| Nd:TAG (Q-Switch, 2w) | Lasermetrics (9560QTG) | 532 |
| argon (mode-locked) | Spectra-Physics | 514.5 |
| pulsed metal vapor laser | | |
| Cu vapor laser | Plasma-Kinetics 751 | 510, 578 |
| Au vapor laser | Plasma-kinetics | 628 |
| Mn vapor laser | Oxford | 534, 1290 |
| Pb vapor laser | Laser CU 25 | 723 |
| Semiconductor diode lasers | M/A COM Type LD 65 | c. 905 |
| Semiconductor diode lasers Array | STANTEL Type LF 100 | c. 905 |
| Pulsed gas lasers (excimer) | | |
| XeCl | Lambda Physik | 308 |
| XeF | EMG-103 | 351 |
| $N_2$ | | 337 |
| $CO_2$ | LSI laser Science inc., PRF 150 G | 9000–11000 |

In the practice of this invention, the laser employed will be for example a pulsed, frequency doubled Nd:YAG laser with a pulse content from 0.01 to 1 joule/cm$^2$ a maximum capacity of about 40 megawatts, pulse duration of 6–8 nanoseconds and a frequency of 20 Hz (Quanta Ray DCR-2A, available from Spectra Physics, Mountain View, Calif.).

If a copper vapor laser (Plasma Kinetics 151) is used, exposure will be carried out with a pulse content of e.g. 250 milli-Joules/cm$^2$, a maximum capacity of about 10 kW, a pulse duration of 30 nanoseconds and a frequency of 6 kHz.

Lasers whose parameters can be readily adjusted, for example pulse content and pulse duration, permit the best possible adaptation to the requirements of the materials to be marked.

The best wavelength to be selected for radiation is that at which the additive effecting a change in color absorbs light most strongly and the inorganic material least strongly.

Three different methods are suitable for laser marking in the practice of this invention: the mask method, the linear marking method and the point matrix method. In these last two mentioned methods (dynamic focusing), the laser is preferably combined with a laser marking system so that the inorganic material can be marked with any, e.g. computer-programmed, digits, letters and special symbols at the point where the laser beam strikes.

The choice of laser system in respect of capacity and frequency depends basically on the marking method employed. The high capacity and low frequency of the solid state pulsed lasers are preferred for mask exposure. The average to low capacities and rapid frequencies of pulsed metal vapor lasers or of continuous wave lasers with pulse modifications are preferred for producing markings that require dynamic focusing. Beam deflection can be effected e.g. acousto-optically, holographically, with galvo-mirrors or polygon scanners, Dynamic focusing makes possible an extremely flexible marking, as the marks can be produced electronically.

U.S. Pat. No. 5,543,269 (1996) to Chatterjee et al. discloses providing a ceramic surface with an image made of a color difference using Airconia and a dopant. The colored area is indicated with a laser beam to reduce the doped aircronium oxide to produce an image. This reference is a highly specialized laser/chemical process limited to the use of special ceramics. It does not teach marking of glass, metals and plastics.

The laser used for transferring the image onto the zirconia surfaces was a Nd:YAG laser, Q-switched, optically pumped with a drypton arc lamp. The wavelength of such a laser is approximately 1.06×10$^{-6}$ meters or 1.06 $\mu$m. The spot size of such a laser is approximately 100 $\mu$m in TEM$_{oo}$ (low order mode). The spot size can be increased to 300 $\mu$m in MM (multimode) using a 163 mm focusing lens. The spot sizes of such lasers can be made a small as 5 $\mu$m by using appropriate lenses. However, it should be kept in mind that laser spot size is a function of the laser-material interaction. The laser spot size depends on the laser wavelength and the lens optics. Thus, the ultimate dot density is determined by the laser and material.

The following parameters were used in the writing and image transfer of a laser onto a sintered ceramic surface of zirconia:

Laser Power: CW average—2 to 40 watts Peak Power—50 W to 5 kW (Q-switched)

Pulse Rate: Up to 50 kHz

Pulse Width: 100 to 150 ns

Sean Field: 114.3×114.3 mm

Scan Velocity: Up to 3 meters/second

Repeatability: +25 $\mu$m

The laser photo marking procedure used in the present invention is described below:

The marking system accepts only vector coordinate instructions and these instructions are fed into the system in the form of a plot file. The plot files are loaded directly into the scanner driver electronics. The electronically stored photographic images are converted to a vector format using a number of commercially available software packages (3.g., Corel Draw, Envision-It by Envision Solutions technology, CA). In the working example of this invention the images were captured electronically with a digital flat bed scanner or a Kodak photo CD. The captured images were converted to the appropriate dot density of approximately 600 dots/cm. These images were then reduced to two colors by dithering to half tones. A raster to vector conversion operation was then executed on the half toned images. The converted vector files in the form of plot files were saved and were laser scanned onto the ceramic surfaces.

The laser written images can easily be erased from the zirconia surfaces by either heating the surfaces in air to around 200° C. For about 10 minutes or by treating with a $CO_2$ laser operating with the following parameters:

Wave Length: 10.6 μm

Peak Power: 300 watts—operated at 20% duty cycle

Average Poser: 70 watts

Beam Size: 500 μm and the beam width was pulse modulated

U.S. Pat. No. 5,075,195 (1991) to Babler et al. discloses the use of a special substrate of plastic having an additive of molybdenum disulfide. The special substrate is irradiated with a laser beam to change the light reflectance of the substrate and form a marking.

Examples of such energy source are solid state pulsed lasers such as ruby lasers or frequency multiplied Nd:YAG lasers, pulsed lasers with booster such as pulsed dye lasers or Raman shifter, and also continuous wave lasers with pulse modifications (Q-switch, mode locker), for example on the basis of CW Nd: YAG lasers with frequency multiplier, or CW ion lasers (Ar, Kr), as well as pulsed metal vapor lasers, for example copper vapor lasers or gold vapor lasers, or high capacity pulsed semi-conductor lasers which emit visible light by frequency doubling, and also pulsed gas lasers such as excimer and nitrogen lasers.

Depending on the laser system employed, pulse contents of up to several Joules per $cm^2$, intensities of up to $10^{12}$ $W/cm^2$, pulse durations of from $10^{-15}$ seconds to $10^{-6}$ seconds and frequencies of up to $10^9$ Hz are possible. Pulse contents of micro-Joule to kilo-Joule, intensities of kilowatt/$cm^2$ to 100 megawatt/$cm^2$, pulse durations of microseconds to picoseconds, and frequencies of a few hertz to 50 kilohertz are advantageously used.

Preferred lasers are pulsed or pulse-modified, frequency doubled Nd:YAG lasers or metal vapor lasers, as well as excimer lasers.

The following table lists a number of commercially available lasers which may be suitably used in the practice of this invention:

TABLE II

| Type/Representative | Examples of commercially available types | Principal wavelength (subsidiary wavelengths) (mm) |
|---|---|---|
| Solid state pulsed lasers | | |
| ruby laser | Lasermetrics (938R6R4L-4 | 694 (347) |
| Nd:YAG laser | Quanta Ray (DCR 2A) | 1064, (532, 355,266) |
| Alexandrite laser | Apollo (7562) | 730-780 |
| Pulsed lasers with booster such as | | |
| Raman Shifter | Quanta Ray (RS-1) | UV-IR |
| dye laser | Lambda FL 2062 | c 300–1000 |
| | Physik | 300–1000 |
| CW laser with pulse modification | | |
| Nd:TAG (Q-Switch, 2w) | Lasermetrics (9560QTG) | 532 |
| argon (mode-locked) | Spectra-Physics SP 2030 | 514.5 488 |

TABLE II-continued

| Type/Representative | Examples of commercially available types | Principal wavelength (subsidiary wavelengths) (mm) |
|---|---|---|
| pulsed metal vapor laser | | |
| Cu vapor laser | plasma-Kinetics 751 | 510, 578 |
| Au vapor laser | plasma-kinetics | 628 |
| Mn vapor laser | Oxford | 534, 1290 |
| Pb vapor laser | Laser CU 25 | 723 |
| Semi-conductor diode lasers | M/A COM Type LD 65 | c. 905 (402) |
| Semi-conductor diode lasers Array | STANTEL Type LF 100 | c. 905 (402) |
| Pulsed gas lasers Excimer | | |
| XeCl | Lambda Physik | 308 |
| XeF | EMG-103 | 351 |
| $N_2$ | | 337 |

In the practice of this invention, the laser employed will be for example a pulsed, frequency double Nd:YAG laser with a pulse content from 0.05 to 1 Joule/$cm^2$, a maximum capacity of about 4 kilowatts, pulse durations of 6–8 nanoseconds and a frequency of 30 Hz (Quanta Ray DCR-2A, available from Spectra Physics, Mountain View, Calif.) If a copper vapor laser with focusing optic (Plasma Kinetics 151) is used, exposure will be carried out with a pulse content of, for example, 250 milli-joules/ $cm^2$, maximum capacity of about 10 kW, a pulse duration of 30 nanoseconds and a frequency of 6 kHz.

Lasers whose parameters can be readily adjusted, for example pulse content and pulse duration, permit the best possible adaptation to the requirements of the materials to be marked.

The best wavelength to be selected for the irradiation is that at which the radiation-sensitive $MoS_2$ and the optional additional colorant absorbs most strongly, and that at which the plastics material to be marked absorbs little.

Preferably laser light with a wavelength in the near UV and/or visible range and/or near IR range is used, but most preferably with a wavelength in the visible range.

No one single laser is known which can produce all the above variety of beam output properties. The present invention combines two lasers into one portable device. A diode via a bypass path made of mirrors can be chosen to provide a direct beam output. Alternatively the diode output beam can be physically directed by the same mirrors to inject the requisite power into a Nd:YAG laser, Q-switched, and the like, thereby providing a pumped laser output beam. All of the electronics, lasers and housing are enclosed in a portable enclosure.

SUMMARY OF THE INVENTION

The main aspect of the present invention is to provide a dual output laser system by bypassing a diode laser beam for use as a direct laser beam as well as using the diode laser beam as a pump.

Another aspect of the present invention is to package the diode pumped laser, the mirror bypass and the control electronics in a portable system.

Other aspects of this invention will appear from the following description and appended claims, reference being made to the accompanying drawings forming a part of this specification wherein like reference characters designate corresponding parts in the several views.

The preferred embodiment is based on a traditional diode pumped laser system. A laser crystal is packaged with input optics for a diode beam used as a pump and an output Q-switch. Upstream from the laser crystal is a diode array and the traditional beam shaping optics. An input bypass mirror is movably mounted in the path of the diode laser beam. When the input bypass mirror is moved away from the path of the diode laser beam, the diode laser beam enters the laser crystal assembly (DPSSL cavity) and pumps the laser crystal. Simultaneously with the withdrawal of the input bypass mirror from the diode laser beam path an output bypass mirror is moved out of the path of the system output beam.

When a direct diode laser beam is selected as the system output beam, both the input and output bypass mirrors are moved into alignment to bypass the diode output beam around the laser crystal by means of two stationary diode bypass mirrors. The resultant diode laser beam is diverted in a first and second 90 angle to emerge from the system in the same path as the pumped laser beam.

The hand-held marking system package includes a hand held housing, dual lasers, contact and infra red safety sensors to prevent an accidental discharge into human flesh, a fan and filter, and a battery and a transceiver f communicating with a host computer. /

BRIEF DESCRIPTION OF THE DRAWINGS

FIG. 1 is a schematic of the diode bypass system shown with the input and output bypass mirrors in the active position.

FIG. 2 is a schematic of the FIG. 1 system showing the bypass mirrors in the passive position.

Figure 3:
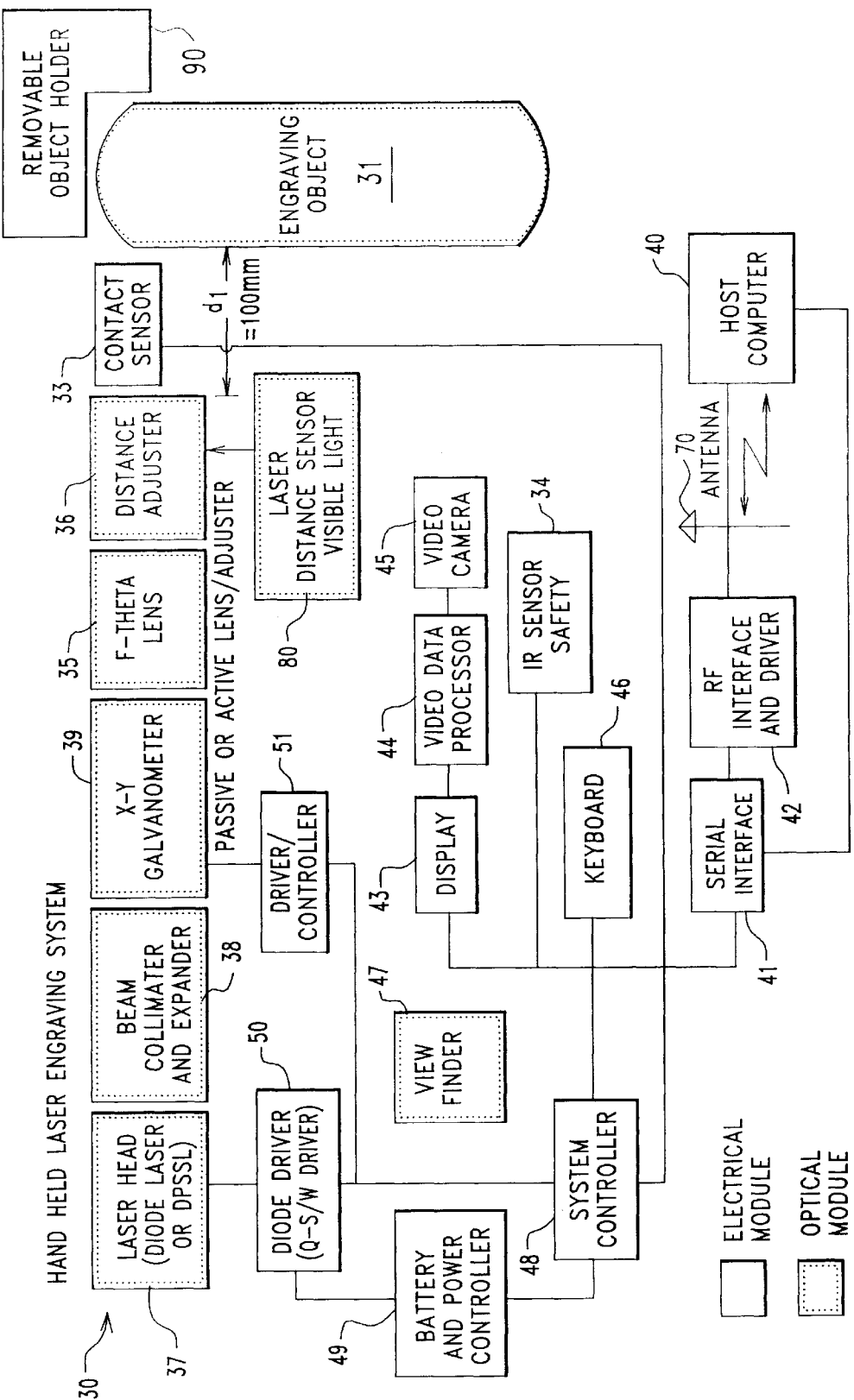
FIG. 3 is a schematic of the hand held dual laser system.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Referring first to FIG. 1 a dual laser system 1 is comprised of a diode array 2 which emits a diode laser beam 3 into a beam shaping lens assembly 4. The resultant collimated beam 5 strikes an input bypass mirror 6 thereby diverting beam 5 90° into a first fixed mirror 7 thereby directing beam 5 90° and parallel to its original path into a second fixed mirror 8 which diverts beam 5 90° and opposite in direction to the diversion of the input bypass mirror 6. A final diversion of 90° resulting in the same direction of original beam 5 is provided by output bypass mirror 9. Input and output bypass mirrors 6, 9 are shown in their active positions wherein beam 5 bypasses the DPSSL cavity 10. The DPSSL cavity 10 comprises a known focusing lens 11, reflective mirrors 12,13, a laser crystal 14, and a Q-switch 15.

Input bypass mirror 6 is supported by an armature 16 which is pivotally connected to wall 18 by hinge 17. Likewise output bypass mirror 9 is supported by armature 19 which is pivotally connected to wall 18 by hinge 20. First and second fixed mirrors 7,8 are mounted to wall 18.

A motive force (not shown) moves input and output bypass mirrors 6,9 into a passive position as shown in FIG. 2. Beam 5 now pumps the laser crystal 14 providing a pumped laser output beam 99 in a known manner. The user can thereby select either a diode output beam 5 or a pumped laser output beam 99. Known in the art are equivalent bypass means including worm gears, sliding assemblies, mirrored shutters and the like.

In the preferred embodiment the following system parameters are provided:

1. Optical Characteristics

| | |
|---|---|
| Diode Laser with or w/o Fiber | Collimated Beam with small divergence (<1 mRad) @ 10 ~ 15 mm⌀ Colimator Expander |
| DPSSL with Expander: Collimated Beam with Small divergence (<0.1 mRad) @ 10 ~ 15 mm⌀ | |
| F-Theta Lens (Rodenstock 4401.302.021) f = 100 mm | |
| minimum spot size Diode Laser ~ 200 μm | |
| DPSSL ~ 20 μm | |

2. Marking Characteristics (with General Scanning MØ Galvanometer×2 or Cambridge Technology's M6800 series×2)

Max. Speed:

| |
|---|
| DPSSL ~ 4 m/sec |
| Diode Laser ~ 1 m/sec |

3. For special applications a diode laser beam can be used with an output power of 5 W–30 W CW, or for normal marking a DPSSL@switched power is used up to 10 W max.

Figure 5:
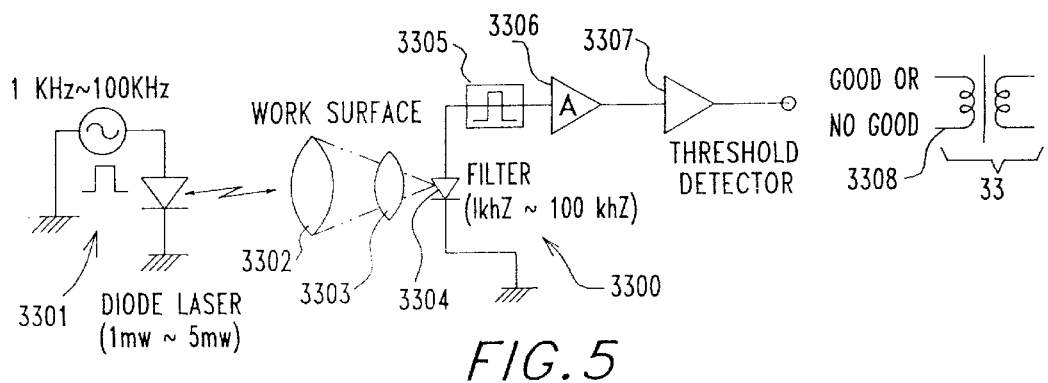
FIG. 5 is a circuit schematic of the contact sensor.

Referring next to FIG. 3 a portable (hand-held) dual laser engraving system 30 is shown. A fixed workpiece 31 is to be engraved. Contact sensor 33 must be activated before the system will emit. A further safety, laser sensor 34, continuously emits and detects an IR beam to sense the presence of human tissue. If human tissue is detected, then the system stops emitting. The same sensor 34 emits a visible aiming and distance sensing beam. In the preferred embodiment the distance sensing beam functions as the contact sensor 33 as shown in FIG. 5.

The lens 35 and distance adjuster 36 are set at a nominal distance of 100 mm in the applicator 32 from the work piece 31. The dual laser head 37 functions as shown in FIGS. 1,2. The beam collimator 38 optimizes the output beam for engraving. The x-y galvanometer 39 moves the output beam in the pattern demanded by the host computer 40. The host computer 40 has engraving control software to move the x-y galvo in chosen pattern by radio communication between the host computer 40 and the on-board system controller 48 via atenna 70. The host computer is separate from the hand held dual laser system 30. The RF interface 42 and serial interface 41 convert the RF signals from the host computer which may correspond to a command to engrave a serial number into a digital format for the system controller 48 in a known manner. A mini-keyboard 46 is located atop the portable laser 30 to enter commands to the system controller 48. The keyboard 46 could be used to enter the identification number of the object engraved which in turn could be transmitted to the host computer 40 to verify the proper workpiece is being engraved. In operation in a factory, dozens of portable lasers 30 could be communicating with the host computer 40 to engrave predetermined data on a variety of workpieces. The system controller 48 and battery 49 are housed with the laser head 37 inside the portable laser 30 as is the diode driver 50, and the drive controller 51. The battery is preferably 12v 40A rechargeable which could engrave over 300 markings. An optional AC adapter and power converter (not shown) may be installed on the portable laser 30.

The on-board video camera 45, video data processor 44 and display 43 allow a user to view a workpiece before, during, and after engraving safely without direct exposure to the laser beam or any reflections. An optional view finder 47 may be installed at the rear of the portable laser 30 to allow a similar viewing of the workpiece.

Figure 4:
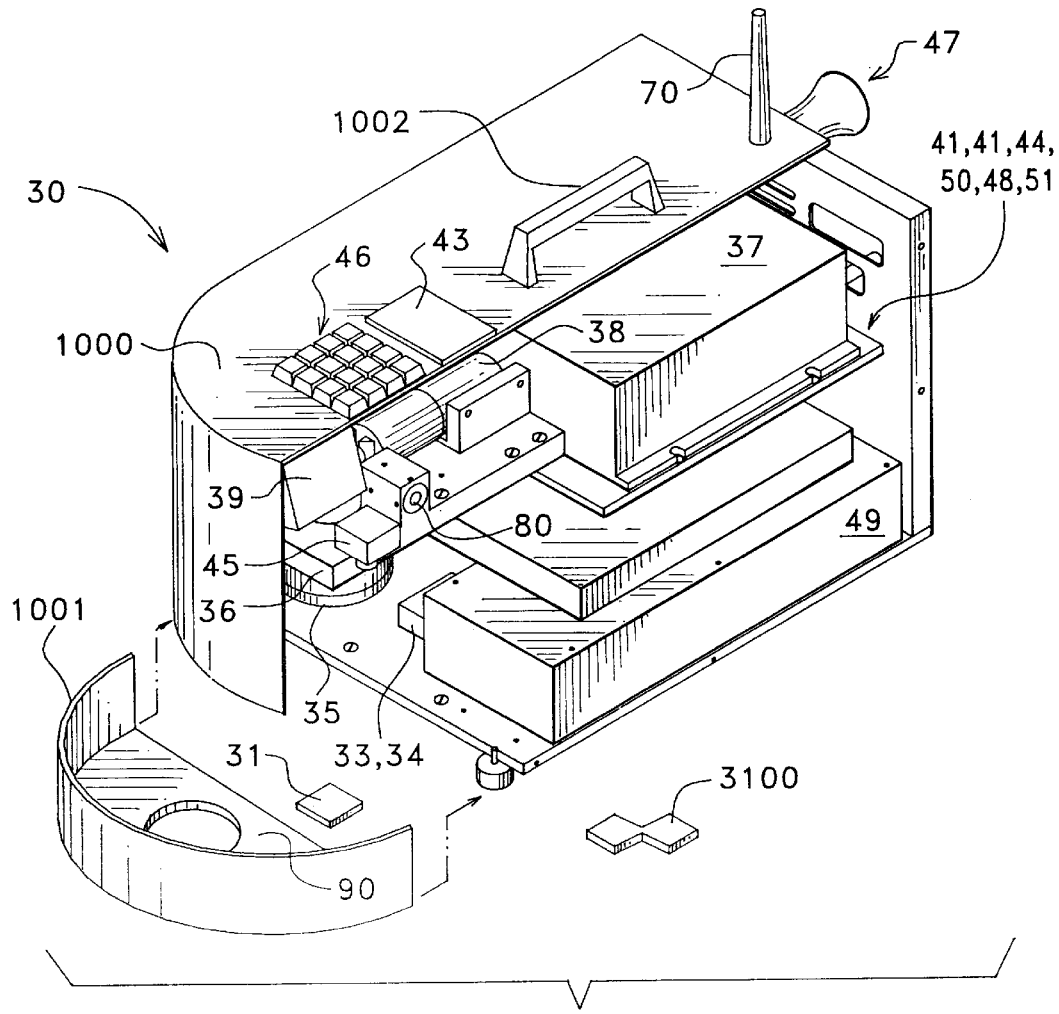
FIG. 4 is a top perspective view of the portable laser.

Referring next to FIG. 4 the portable laser 30 is shown to have a housing 1000 with a handle 1002. A removable compartment 1001 contains a removable object holder 90 which can be an adjustable height table with a horizontal displacement also. The removable object holder 90 can be used to mark smaller movable objects such as name tags or jewelry 31. When a larger workpiece 3100 is to be marked, the removable compartment 1001 is removed. Then the portable laser 30 is placed directly over the workpiece 3100. The user can see the workpiece with the display 43. An alternate embodiment user a viewfinder 47.

A third laser 80 is housed inside the housing 1000. Laser 80 is a low power 1–5 milli-watt diode laser. It is used for aiming a harmless visible red light beam onto the target. It is also used as the distance sensor per FIG. 5 which functions as a contact sensor 33. It can also serve as an IR safety sensor 34 to detect via known feedback techniques the presence of flesh in its sight path which corresponds to the target area of the laser head 37.

Regarding the battery power consumption, it is estimated that the portable laser will use 500 watts peak during a DPSSL engraving and 100 watts peak at idle time. For 10-second engravings, it is estimated that a state of the art battery will provide 300 markings before recharging or replacement is needed.

Programmable logic in the system controller 48 may include embedded designs and/or alphanumeric marks. Counting logic may be included. Feedback logic to the host computer 40 may be included. The portable laser 30, a host computer 40, and a battery charger (not shown) could be installed on a vehicle to mark anything ranging from artillery shells to tanks themselves, airplanes or parts, or automobile glass in a parking lot.

Referring nexty to FIG. 5 the contact sensor 33 in the preferred embodiment is a distance sensing circuit 3300 having a low-power diode laser 3301 which impinges onto a workpiece surface 3302. A reflected beam is focused by lens 3303 onto a sensor 3304 which is connected to a filter 3305, an amplifier 3306 and a threshold detector 3307 to determine if the workpiece is within a predetermined distance from the diode laser 3301. If not, then a relay 3308 stops the power to the laser head 37.

Figure 6:
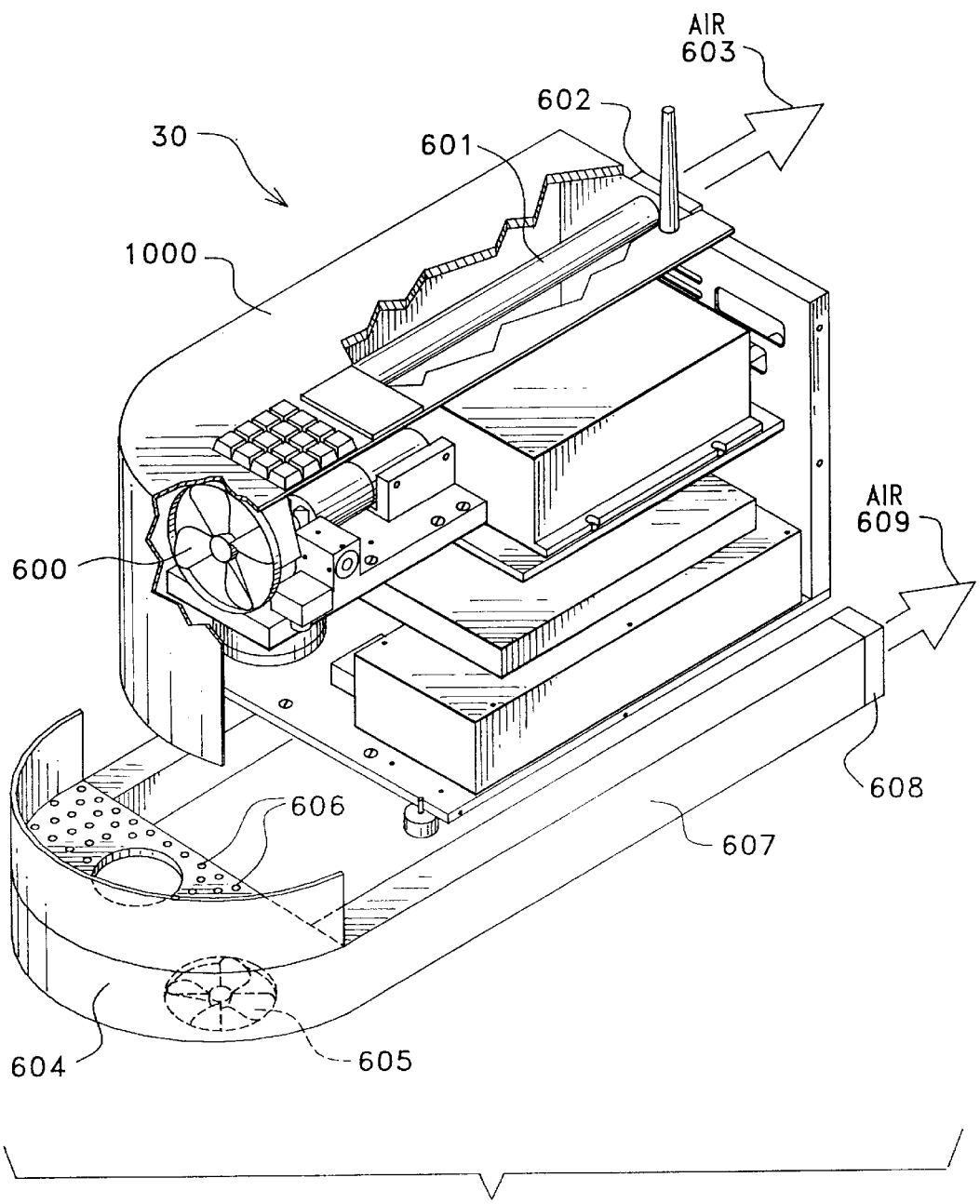
FIG. 6 is a top perspective view of the optional fan and filter assemblies installed in the portable laser.

Referring next to FIG. 6 two optional suction/filter systems are shown. The housing 1000 can include a fan 600 connected to a duct 601 which feeds through a filter 602 to allow filtered air 603 to return to the workplace. An alternative fan 605 is housed in removable assembly 604 to draw fumes through holes 606 through duct 607 onto filter 608 to rpoduce filtered air 609.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A dual beam laser comprising:
   a diode laser emitting a diode output beam;
   a laser crystal assembly pumped by the diode beam, thereby emitting a pumped output beam from an enclosure;
   a bypass assembly to selectively divert the diode output beam away from the laser crystal assembly and out the enclosure and
   wherein the bypass assembly further comprises an input and an output bypass mirror and a first and a second fixed mirror, wherein in an active mode said input bypass mirror diverts the diode output beam 90° away from the laser crystal assembly, the first fixed mirror diverts the beam parallel to the laser crystal assembly, the second fixed mirror diverts the beam 90° toward the laser crystal assembly, and the output bypass mirror diverts the beam 90° and parallel to the laser crystal assembly and out a common exit port as the pumped laser beam exits from; and wherein in a passive mode the mirrors allow the diode output beam to pump the laser crystal assembly.

2. A hand held laser apparatus comprising:
   a laser head;
   a beam steering assembly used to steer a beam generated by the laser head;
   a power source used to power all system electrical elements;
   a system controller to accomplish all command and control functions of the system;
   a contact sensor to shut down the laser head when an object other than a workpiece enters a path of a beam from the laser head; and wherein the contact sensor further comprises a low-power laser and a distance sensor.

3. The apparatus of claim 2 further comprising a transceiver to communicate with a host computer.

4. The apparatus of claim 3 further comprising a keyboard, and a display and an engraving control program to control the system controller and in turn control the beam steering assembly to produce a desired engraving pattern.

5. The apparatus of claim 2, wherein the laser head further comprises a dual beam laser having a diode laser emitting a diode output beam and a laser crystal assembly receiving said diode output beam for pumping and having a bypass assembly to direct the diode output beam directly out the hand held laser apparatus.

6. The apparatus of claim 5 further comprising a transceiver to communicate with a host computer.

7. The apparatus of claim 6 further comprising a keyboard, a display, and an engraving control program to control the system controller and in turn control the beam steering assembly to produce a desired engraving pattern.

8. The apparatus of claim 7, wherein the display further comprises a video data processor and a video camera.

9. The apparatus of claim 7 further comprising a removable object holder to enable a user to engrave a workpiece in the removable object holder and a remote workpiece with the removable object holder disengaged.

10. The apparatus of claim 7 further comprising an exhaust fan and filter.

11. The apparatus of claim 5, wherein the contact sensor further comprises a visible aiming beam.

12. The apparatus of claim 11, wherein the contact sensor further comprises a flesh detecting IR beam to detect flesh and shut down the system if flesh is detected.

13. The apparatus of claim 9, wherein the removable object holder further comprises a movable work table.

* * * * *